United States Patent
Kobayashi

(10) Patent No.: US 7,236,435 B2
(45) Date of Patent: Jun. 26, 2007

(54) ADDRESS INFORMATION RECORDING DEVICE AND RECORDING METHOD AND REPRODUCING DEVICE AND REPRODUCING METHOD

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 10/276,576

(22) PCT Filed: Mar. 15, 2002

(86) PCT No.: PCT/JP02/02502

§ 371 (c)(1),
(2), (4) Date: Apr. 30, 2003

(87) PCT Pub. No.: WO02/075729

PCT Pub. Date: Sep. 26, 2002

(65) Prior Publication Data

US 2003/0179678 A1    Sep. 25, 2003

(30) Foreign Application Priority Data

Mar. 16, 2001 (JP) .............................. 2001-076228

(51) Int. Cl.
*G11B 7/00* (2006.01)
(52) U.S. Cl. ................... 369/47.22; 369/47.31
(58) Field of Classification Search ............. 369/47.22, 369/47.31, 53.34, 59.25
See application file for complete search history.

(56) References Cited

U.S. PATENT DOCUMENTS

| 5,541,960 | A | * | 7/1996 | Satomura et al. ............ 375/368 |
| 5,886,985 | A | * | 3/1999 | Kobayashi et al. ....... 369/275.3 |
| 6,192,018 | B1 | | 2/2001 | Kobayashi et al. ........... 369/59 |
| 6,201,778 | B1 | * | 3/2001 | Sensyu .................... 369/53.34 |
| 6,545,960 | B2 | * | 4/2003 | Miyamoto et al. ....... 369/47.27 |
| 6,549,495 | B1 | * | 4/2003 | Spruit et al. ............. 369/47.19 |
| 6,687,206 | B1 | * | 2/2004 | Masui ..................... 369/47.19 |
| 2002/0027855 | A1 | * | 3/2002 | Shishido et al. ......... 369/53.22 |

FOREIGN PATENT DOCUMENTS

| JP | 4-90169 | 3/1992 |
| JP | 2000-276809 | 10/2000 |
| JP | 2001-34952 | 2/2001 |
| WO | WO 00/43996 | 7/2000 |

OTHER PUBLICATIONS

U.S. Appl. No. 11/488,751, filed Jul. 19, 2006, Kobayashi et al.

* cited by examiner

*Primary Examiner*—Wayne Young
*Assistant Examiner*—Lixi Chow
(74) *Attorney, Agent, or Firm*—Oblon, Spivak, McClelland, Maier & Neustadt, P.C.

(57) ABSTRACT

A method for recording address information to an optical disc (5) by forming a wobbled groove is provided. The method includes steps S1 to S3. In step S1, there is generated address information composed of a sync signal, address data and an error correction code for the address data. In step S2, a carrier signal is multiplied by the address information to generate a phase modulation signal. In step S3, there is formed on the optical disc (5) a spiral groove wobbled adaptively to the phase modulation signal.

15 Claims, 16 Drawing Sheets

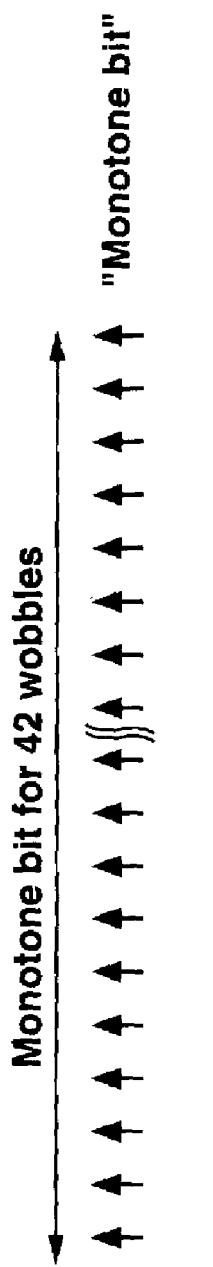
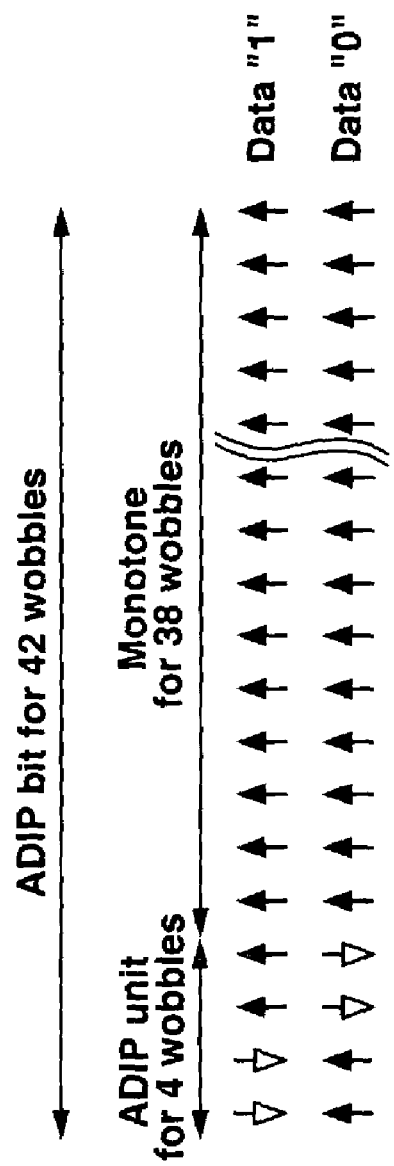
FIG.9A
FIG.9B

R-S (15,7,9) in nibble (=4bits) units

| | | | | | |
|---|---|---|---|---|---|
| Nibble | 0 | RUB No. bit 19 | RUB No. bit 18 | RUB No. bit 17 | RUB No. bit 16 |
| Nibble | 1 | RUB No. bit 15 | RUB No. bit 14 | RUB No. bit 13 | RUB No. bit 12 |
| Nibble | 2 | RUB No. bit 11 | RUB No. bit 10 | RUB No. bit 9 | RUB No. bit 8 |
| Nibble | 3 | RUB No. bit 7 | RUB No. bit 6 | RUB No. bit 5 | RUB No. bit 4 |
| Nibble | 4 | RUB No. bit 3 | RUB No. bit 2 | RUB No. bit 1 | RUB No. bit 0 |
| Nibble | 5 | Address No. bit | Address No. bit | Layer No. bit 1 | Layer No. bit 0 |
| Nibble | 6 | Reserved bit 3 | Reserved bit 2 | Reserved bit 1 | Reserved bit 0 |
| Nibble | 7 | Parity bit 31 | Parity bit 30 | Parity bit 29 | Parity bit 28 |
| Nibble | 8 | Parity bit 27 | Parity bit 26 | Parity bit 25 | Parity bit 24 |
| Nibble | 9 | Parity bit 23 | Parity bit 22 | Parity bit 21 | Parity bit 20 |
| Nibble | 10 | Parity bit 19 | Parity bit 18 | Parity bit 17 | Parity bit 16 |
| Nibble | 11 | Parity bit 15 | Parity bit 14 | Parity bit 13 | Parity bit 12 |
| Nibble | 12 | Parity bit 11 | Parity bit 10 | Parity bit 9 | Parity bit 8 |
| Nibble | 13 | Parity bit 7 | Parity bit 6 | Parity bit 5 | Parity bit 4 |
| Nibble | 14 | Parity bit 3 | Parity bit 2 | Parity bit 1 | Parity bit 0 |

15 nibbles in total
Data, 7 nibbles — ADIP address
Reserve
Parity, 8 nibbles — Nibble-based R-S ECC RUB Address No. / RUB: 20 bits
Layer: 2 bits
Reserved: 2 bits
Parity: 4 bits
Total: 32 bits
60 bits

FIG.10

FIG.14A PSK stream
$y(t) = a(t)\cos\theta(t)$

FIG.14B Carrier
$x(t) = \cos\theta(t)$

FIG.14C $z(t) = x(t) \cdot y(t)$

FIG.14D Data
$a(t)$

ADDRESS INFORMATION RECORDING DEVICE AND RECORDING METHOD AND REPRODUCING DEVICE AND REPRODUCING METHOD

TECHNICAL FIELD

The present invention relates to an apparatus for, and a method of, recording address information by forming a wobble groove on a disc-shaped recording medium, an apparatus for, a method of, reproducing address information from a wobbled groove formed on a disc-shaped recording medium, a program for recording, and reproducing, address information to, and from, a disc-shaped recording medium, and a recording medium having the program recorded therein.

BACKGROUND ART

Heretofore, a recording medium shaped like a disc such as an optical disc, magnetic disc, magneto-optical disc or the like has a spiral groove formed thereon for the purpose of tracking. It is already known to record address information by wobbling the groove adaptively to the address information.

Address information to be recorded to a disc-shaped recording medium is composed of a sync signal indicative of an address start position and an address indicative of address data itself. Some of address information further contain an error correction code (ECC) for the address data.

Since a sync signal included in address signal is not sufficiently long, it cannot have any ECC appended thereto. Unless a sync signal in address information can be reproduced accurately, address data having an ECC appended thereto cannot be reproduced either. In other words, the error rate of address information depends upon whether a sync signal in the address information can be reproduced accurately or not. Therefore, a method of accurately reproducing a sync signal in address signal should desirably be established.

DISCLOSURE OF THE INVENTION

Accordingly, the present invention has an object to overcome the above-mentioned drawbacks of the related art by quickly accessing a given address through accurate reproduction of a sync signal included in address information.

The above object can be attained by providing an apparatus for recording address information to a disc-shaped recording medium, the apparatus including according to the present invention:

means for generating address information composed of a sync signal including a plurality of sync unit patterns, address data and an error correction code for the address data;

a modulating means for generating a phase modulation signal corresponding to the address information generated by the address information generating means; and means for forming, on a disc-shaped recording medium, a spiral groove wobbled adaptively to the phase modulation signal generated by the modulating means. The disc-shaped recording medium referred to herein is an optical disc.

In the above recording apparatus, the address information generating means generates address information composed of a sync signal including four types of sync unit patterns, address data and an ECC for the address data.

Also, the above object can be attained by providing a method for recording address information to a disc-shaped recording apparatus, the method including, according to the present invention:

a generating step of generating address information composed of a sync signal including a plurality of sync unit patterns, address data and an error correction code for the address data;

a modulation step of generating a phase modulation signal corresponding to the address information generated in the address information generating step; and a forming step of forming, on a disc-shaped recording medium, a spiral groove wobbled adaptively to the phase modulation signal generated in the modulating step.

Also, the above object can be attained by providing a program for recording address information to a disc-shaped recording medium, the program including, according to the present invention:

a generating step of generating address information composed of a sync signal including a plurality of sync unit patterns, address data and an error correction code for the address data;

a modulation step of generating a phase modulation signal corresponding to the address information generated in the address information generating step; and a forming step of forming, on a disc-shaped recording medium, a spiral groove wobbled adaptively to the phase modulation signal generated in the modulating step.

Also, the above object can be attained by providing a program for causing a computer, which controls operations for recording address information to a disc-shaped recording medium, to execute, according to the present invention:

a generating step of generating address information composed of a sync signal including a plurality of sync unit patterns, address data and an error correction code for the address data;

a modulation step of generating a phase modulation signal corresponding to the address information generated in the address information generating step; and a forming step of forming, on a disc-shaped recording medium, a spiral groove wobbled adaptively to the phase modulation signal generated in the modulating step.

Note that this program will also be referred to as "first program" below for the convenience of the explanation.

Also, the above object can be attained by providing an apparatus for reproducing an address on a disc-shaped recording medium on the basis of wobbles of a groove formed on the disc-shaped recording medium, the apparatus including according to the present invention:

radiating means for radiating laser light to the disc-shaped recording medium;

return light detecting means for detecting return light from the disc-shaped recording medium to generate a return light signal corresponding to the return light thus detected;

wobbling signal generating means for generating a wobbling signal corresponding to the wobbles of the groove on the basis of the return light signal generated by the return light detecting means;

demodulating means for demodulating the wobbling signal generated by the wobbling signal generating means to recover address information composed of a sync signal including a plurality of sync unit patterns, address data and an error correction code for the address data;

sync unit pattern detecting means for detecting at least one of the plurality of sync unit patterns included in the sync signal in the address information recovered by the address information recovering means;

acquiring means for acquiring the address data and error correction code for the address data from the address information on the basis of the position of the sync unit pattern detected by the sync unit pattern detecting means; and reproducing means for reproducing the address on the basis of the address data and the error correction code for the address data, extracted by the acquiring means.

The disc-shaped recording medium referred to herein is an optical disc.

The above address information reproducing apparatus further includes means for generating a clock signal on the basis of the position of the sync unit pattern detected by the detecting means.

Also, the above object can be attained by providing a method for reproducing an address on a disc-shaped recording medium on the basis of wobbles of a groove formed on the disc-shaped recording medium, the method including, according to the present invention:

a radiating step of radiating laser light to the disc-shaped recording medium;

a return light detecting step of detecting return light from the disc-shaped recording medium to generate a return light signal corresponding to the return light thus detected;

a wobbling signal generating step of generating a wobbling signal corresponding to the wobbles of the groove on the basis of the return light signal generated in the return light detecting step;

a demodulating step of demodulating the wobbling signal generated in the wobbling signal generating step to recover address information composed of a sync signal including a plurality of sync unit patterns, address data and an error correction code for the address data;

a sync unit pattern detecting step of detecting at least one of the plurality of sync unit patterns included in the sync signal in the address information recovered in the address information recovering step;

an acquiring step of acquiring the address data and error correction code for the address data from the address information on the basis of the position of the sync unit pattern detected in the sync unit pattern detecting step; and a reproducing step of reproducing the address on the basis of the address data and the error correction code for the address data, extracted in the acquiring step.

Also, the above object can be attained by providing a program for reproducing an address on a disc-shaped recording medium on the basis of wobbles of a groove formed on the disc-shaped recording medium, the program including, according to the present invention:

a radiating step of radiating laser light to the disc-shaped recording medium;

a return light detecting step of detecting return light from the disc-shaped recording medium to generate a return light signal corresponding to the return light thus detected;

a wobbling signal generating step of generating a wobbling signal corresponding to the wobbles of the groove on the basis of the return light signal generated in the return light detecting step;

a demodulating step of demodulating the wobbling signal generated in the wobbling signal generating step to recover address information composed of a sync signal including a plurality of sync unit patterns, address data and an error correction code for the address data;

a sync unit pattern detecting step of detecting at least one of the plurality of sync unit patterns included in the sync signal in the address information recovered in the address information recovering step;

an acquiring step of acquiring the address data and error correction code for the address data from the address information on the basis of the position of the sync unit pattern detected in the sync unit pattern detecting step; and a reproducing step of reproducing the address on the basis of the address data and the error correction code for the address data, extracted in the acquiring step.

Also, the above object can be attained by providing a program for causing a computer, which controls operations for reproducing an address on a disc-shaped recording medium on the basis of wobbles of a groove formed on the disc-shaped recording medium, to execute, according to the present invention:

a radiating step of radiating laser light to the disc-shaped recording medium;

a return light detecting step of detecting return light from the disc-shaped recording medium to generate a return light signal corresponding to the return light thus detected;

a wobbling signal generating step of generating a wobbling signal corresponding to the wobbles of the groove on the basis of the return light signal generated in the return light detecting step;

a demodulating step of demodulating the wobbling signal generated in the wobbling signal generating step to recover address information composed of a sync signal including a plurality of sync unit patterns, address data and an error correction code for the address data;

a sync unit pattern detecting step of detecting at least one of the plurality of sync unit patterns included in the sync signal in the address information recovered in the address information recovering step;

an acquiring step of acquiring the address data and error correction code for the address data from the address information on the basis of the position of the sync unit pattern detected in the sync unit pattern detecting step; and a reproducing step of reproducing the address on the basis of the address data and the error correction code for the address data, extracted in the acquiring step.

Note that this program will also be referred to as "second program" below for the convenience of the explanation.

The disc-shaped recording medium according to the present invention has formed thereon a spiral groove wobbled adaptively to a phase modulation signal corresponding to address information composed of a sync signal including a plurality of sync unit patterns, address data and an error correction code for the address data. The disc-shaped recording medium referred to herein is an optical disc.

In the above address information recording apparatus and method and program for recording address information to the disc-shaped recording medium, there are generated address information composed of the sync signal including the plurality of sync unit patterns, address data and an error correction code for the address data, and the phase modulation signal corresponding to the address information thus generated. Further, the groove wobbled adaptively to the phase modulation signal thus generated is formed on the disc-shaped recording medium.

In the address information reproducing apparatus and method and second program, laser light is radiated to the disc-shaped recording medium, return light from the disc-shaped recording medium is detected, the return light signal is generated corresponding to the return light, and the wobbling signal corresponding to the wobbles of the groove is generated on the basis of the return light signal thus generated. The wobbling signal thus generated is demodulated to recover the address information composed of the sync signal including the plurality of sync unit patterns, address data and the error correction code for the address data, and at least one of the sync unit patterns included in the sync signal of the address information thus recovered is detected. Further, based on the position of the sync unit pattern thus detected, the address data and error correction code for the address data are extracted from the address information, and an address is reproduced based on the address data and error correction code for the address data, thus extracted.

Also, the above object can be attained by providing a disc-shaped recording medium having formed thereon, according to the present invention, a spiral groove wobbled adaptively to a phase modulation signal corresponding to address information composed of a sync signal including a plurality of sync unit patterns, address data and error correction code for the address data.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 9A and 9B show two different ADIP unit patterns.

FIG. 10 explains an error correction code for address data.

BEST MODE FOR CARRYING OUT THE INVENTION

Figure 1:
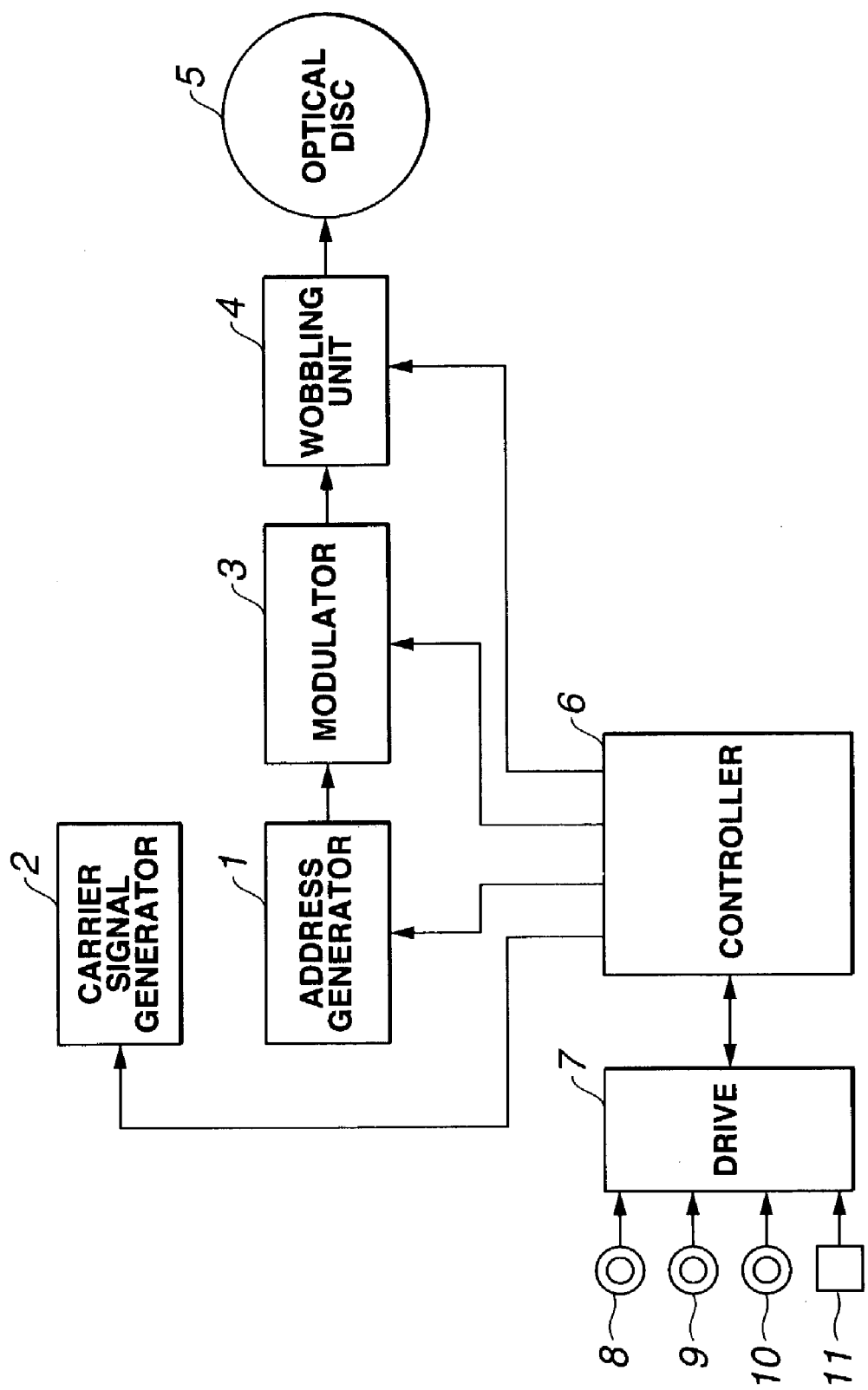
FIG. 1 is a block diagram of the address recording apparatus according to the present invention.
Figure 2:
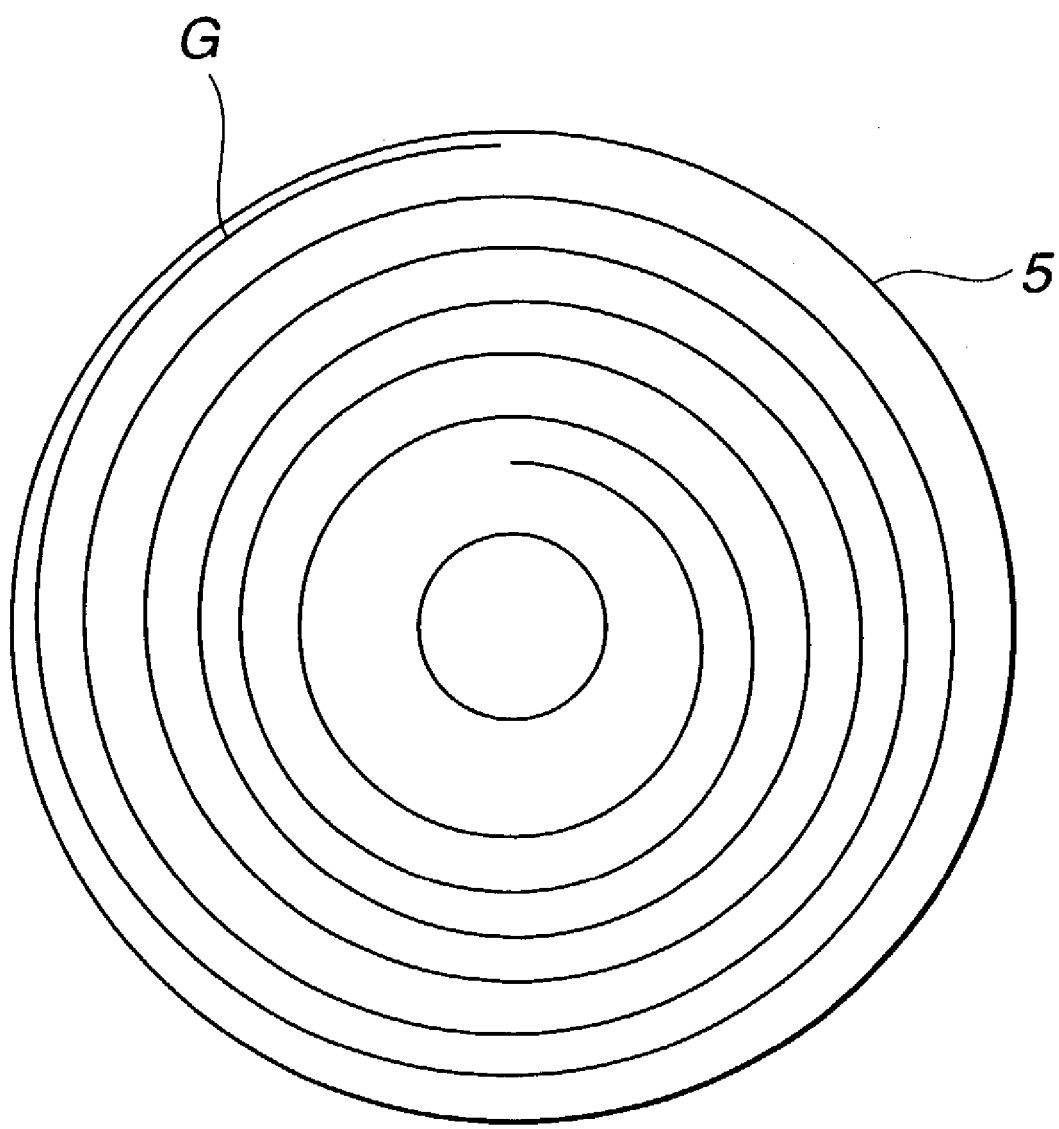
FIG. 2 is a plan view of an optical disc having a spiral groove formed thereon.
Figure 3:
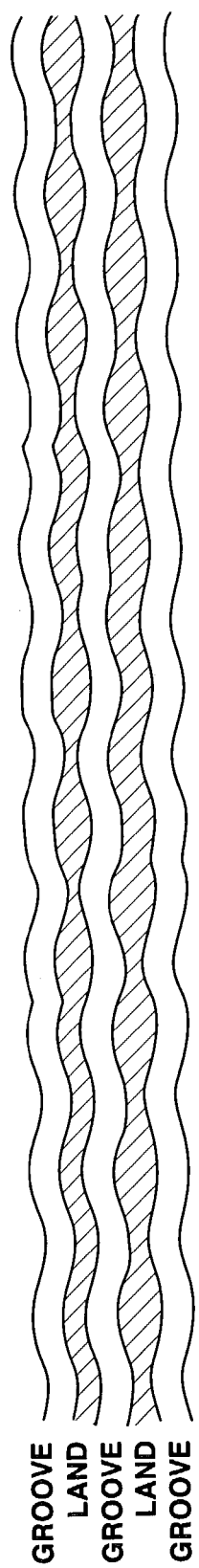
FIG. 3 is a plan view showing how the grooves are wobbled.

The address recording apparatus according to the present invention is constructed as shown in FIG. 1. When an optical disc is being produced, there is formed on the optical disc 5 a groove G having a spiral form intended for tracking as shown in FIG. 2 and wobbled adaptively to address information as shown in FIG. 3.

As shown, the address recording apparatus according to the present invention includes an address generator 1. The address generator 1 generates address information to be recorded to an optical disc 5 shown in FIG. 2. The address information is binary digital data composed of a sync signal, address data and an error correction code (ECC) for the address data. The address generator 1 converts the address information into a binary signal a(t) and supplies the signal to a modulator 3. Digital data "1" included in the address data is converted into a binary signal a(t) (=1) while digital data "0" is converted into a binary signal a(t) (=−1). It should be noted that the binary signal a(t) resulted from conversion of address information being binary digital data will also be referred to as "address information a(t)" hereunder.

The address recording apparatus includes also a carrier signal generator 2 to generate a carrier signal x(t) (=cos θ(t)) which is to carry the address information, and supplies the signal to a modulator 3 also included in the apparatus.

The modulator 3 is provided to make phase modulation of the carrier signal x(t) by multiplying the address information a(t) supplied from the address generator 1 by the carrier signal x(t) (=cos θ(t)) supplied from the carrier signal generator 2 and outputs, to a wobbling unit 4 also included in the apparatus, a phase modulation signal y(t) (=a(t)·cos θ(t)) corresponding to resultant address information. Since the address information is a binary signal indicative of "1" or "−1" as mentioned above, the phase modulation signal y(t) is either in phase with the carrier signal x(t), namely, y(t)=x(t)=cos θ(t) or in opposite phase to the carrier signal x(t), namely, y(t)=−x(t)=−cos θ(t).

The wobbling unit 4 forms, on the optical disc 5, a spiral groove wobbled according to the phase modulation signal y(t) supplied from the modulator 3.

The address recording apparatus further includes a controller 6 to control a drive 7 to read a control program from a magnetic disc 8, optical disc 9, magneto-optical disc 10 or a semiconductor memory 11, and then control the entire address recording apparatus on the basis of the control program thus read.

Figure 4:
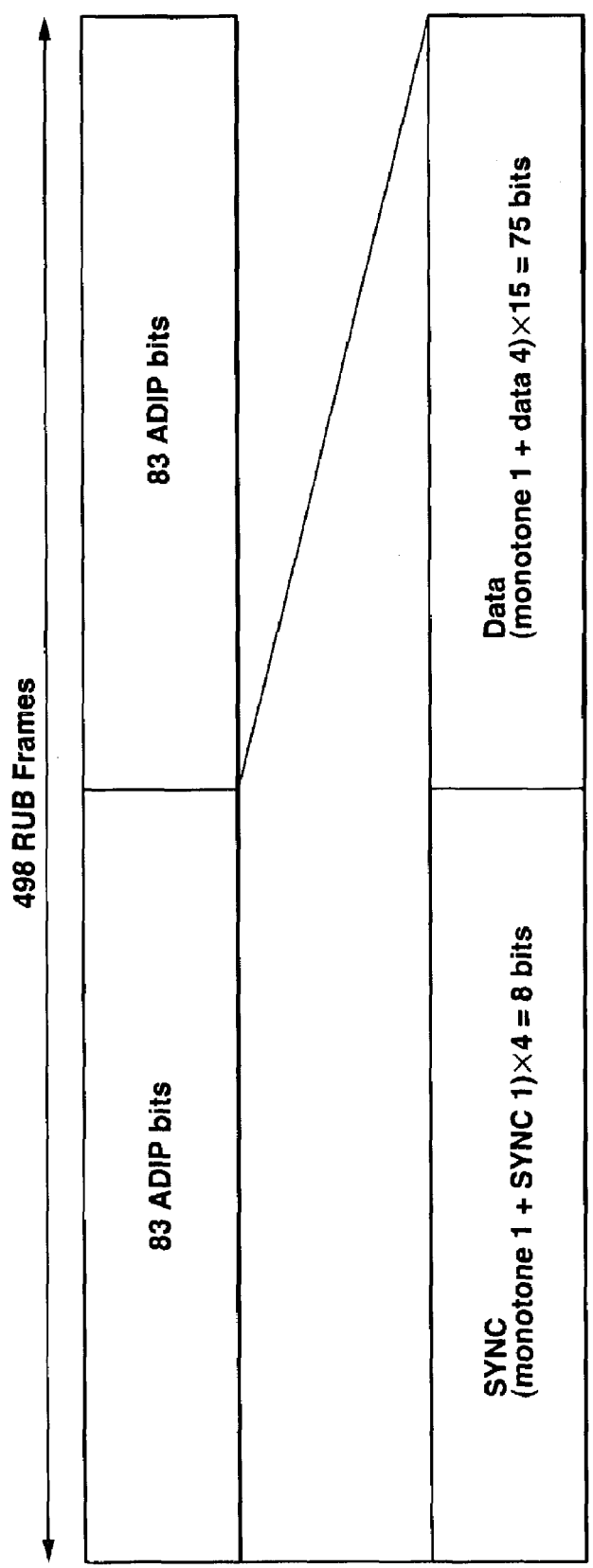
FIG. 4 shows the configuration of address information (ADIP) corresponding to a write-read cluster RUB.

FIG. 4 shows the configuration of address information recorded correspondingly to a write-read cluster RUB (read unit block) of the optical disc 5. Two pieces of address information (ADIP: address in pre-groove) are recorded in the read-write cluster RUB. Each piece of address information is of 83 bits of which 8 bits are for a sync part (SYNC) indicating a sync signal, and 75 bits are for a data part indicating address data and ECC for the address data.

Figure 5A:
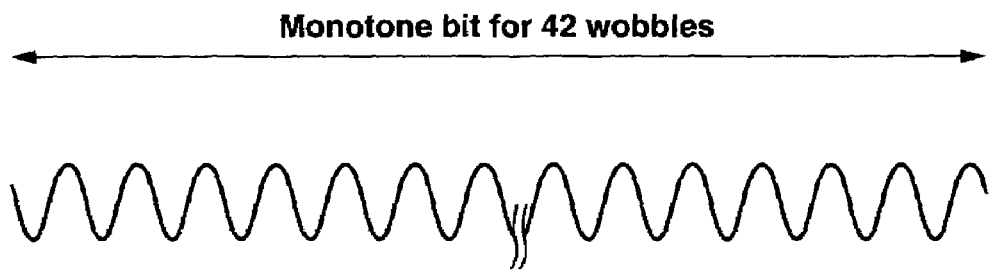
FIG. 5A shows a monotone bit.
Figure 5B:
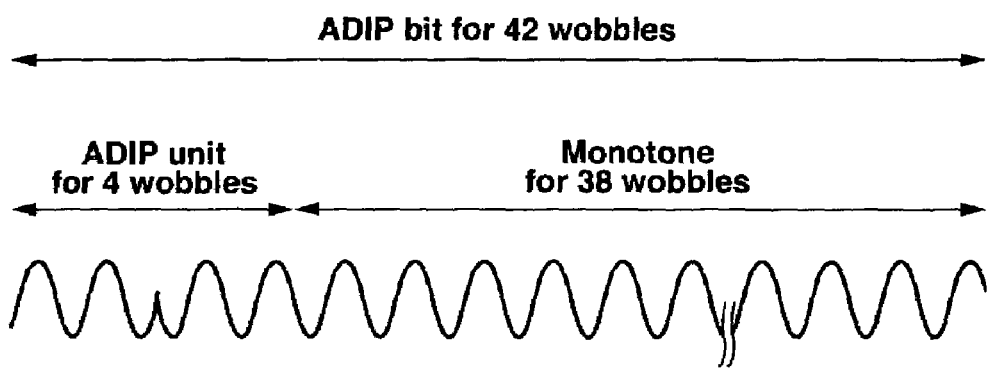
FIG. 5B shows an ADIP bit.

Information of 1 bit is formed as 42 wobbles (for 42 cycles) on the optical disc 5. One bit for the 42 wobbles is classified into a monotone bit for a succession of in-phase wobbles as shown in FIG. 5A, an ADIP bit, not any monotone bit, (a phase modulation takes in the period of 42 wobbles) as shown in FIG. 5B, etc.

Figure 6:
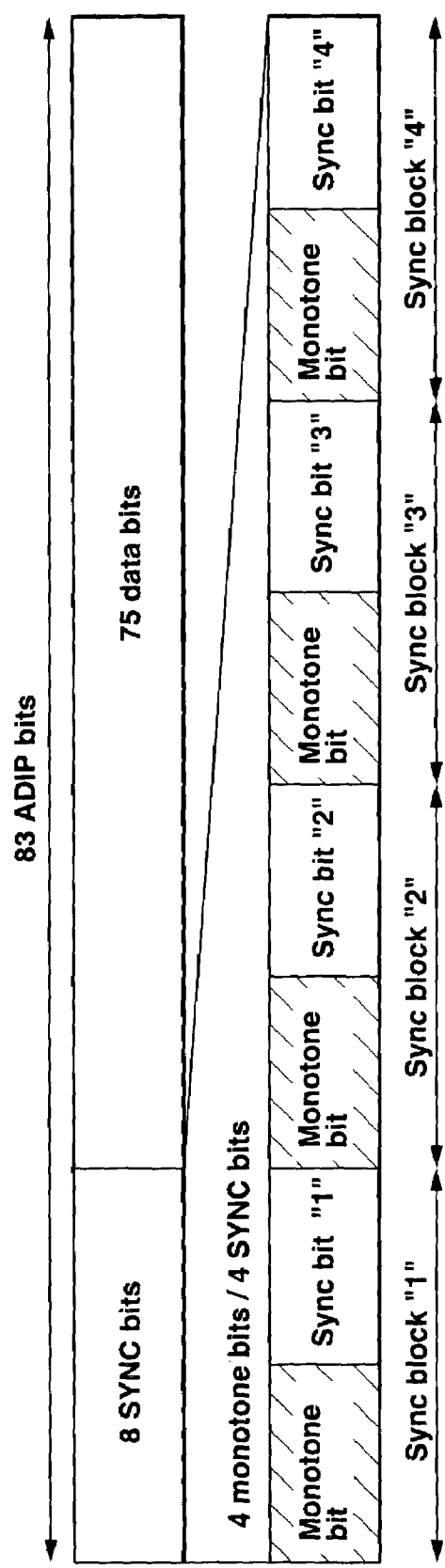
FIG. 6 shows the configuration of an 8-bit sync part.

FIG. 6 shows the configuration of a sync part of 8 bits. As shown, the sync part is composed of four sync blocks "1" to "4" each including a monotone bit and a sync bit.

As shown in FIGS. 7A to 7D, a sync bit (for 42 wobbles) is composed of a sync unit for 12 wobbles and a monotone for 30 wobbles (succession of in-phase wobbles).

FIGS. 7A to 7D show wobbles for sync blocks "1" to "4", namely, a phase modulation signal y(t). In FIGS. 7A to 7D and subsequent drawings and description, the upward arrow "↑" indicates a wobble for one cycle of the phase modulation signal y(t) (=cos θ(t)), and the downward arrow "↓" indicates a wobble for one cycle of a phase modulation signal in opposite phase to the carrier signal, that is, a phase modulation signal y(t) (=−cos θ(t)).

Figure 7:
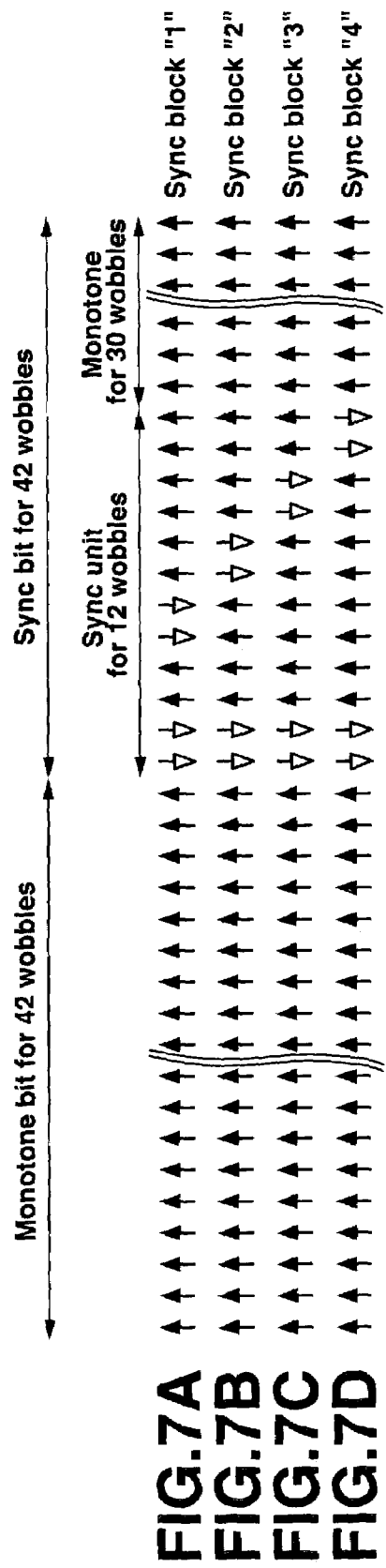
FIGS. 7A to 7D show four types of sync unit patterns included in the sync part.

The sync unit (for 12 wobbles) in the sync block "1" is formed as a first sync unit pattern "↓↓↑↑↓↓↑↑↑↑↑↑" as shown in FIG. 7A. The sync unit (for 12 wobbles) in the sync block "2" is formed as a second sync unit pattern "↓↓↑↑↑↑↓↓↑↑↑↑" as shown in FIG. 7B. The sync unit (for 12 wobbles) in the sync block "3" is formed as a third sync unit pattern "↓↓↑↑↑↑↑↑↓↓↑↑" as shown in FIG. 7C. The sync unit (for 12 wobbles) in the sync block "4" is formed as a fourth sync unit pattern "↓↓↑↑↑↑↑↑↑↑↓↓" as shown in FIG. 7D.

The 8-bit sync part will include all the above-mentioned first to fourth sync unit patterns. For reproducing address information, when at least one of the first to fourth sync unit patterns can be reproduced, the position of the sync part, that is, the address information, can accurately be determined.

Figure 8:
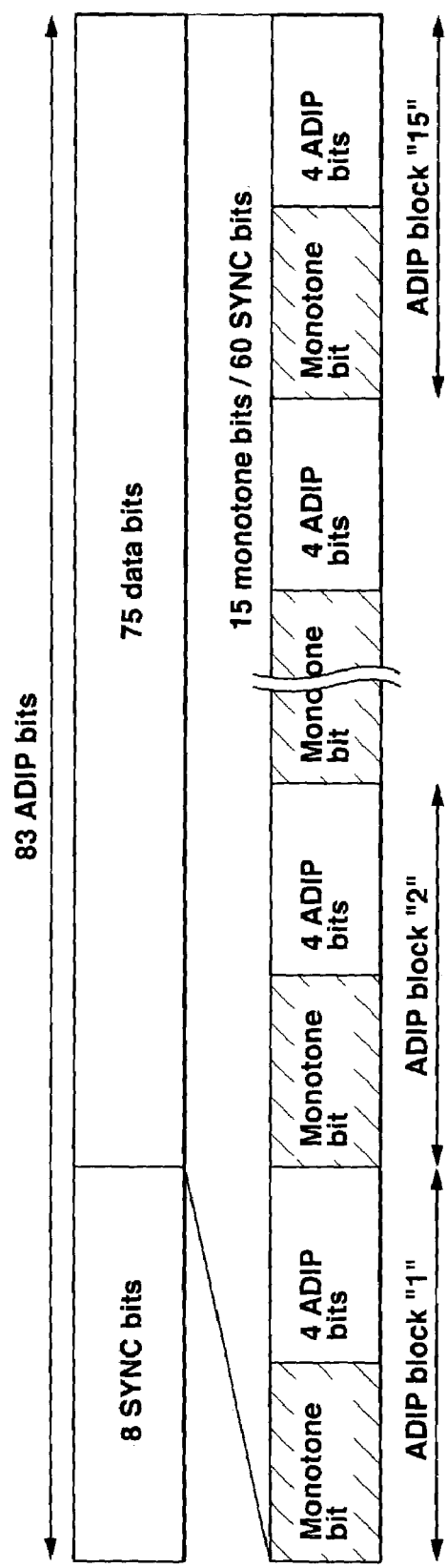
FIG. 8 shows the configuration of a 75-bit data part.

FIG. 8 shows the configuration of the 75-bit data part. As will be seen from FIG. 8, the data part include fifteen ADIP blocks "1" to "15" each composed of a monotone bit and four ADIP bits.

FIG. 9A shows a wobble corresponding to a monotone bit, that is, a phase modulation signal y(t).

FIG. 9B shows a wobble corresponding to one of the four ADIP bits included in one ADIP block, that is, a phase modulation signal y(t). An ADIP bit (for 42 wobbles) corresponding to 1-bit digital data "1" of address data on the address information is composed of an ADIP unit having a first ADIP unit pattern "↓↓↑↑" and a monotone for 38 wobbles next to the ADIP unit. An ADIP bit (for 42 wobbles) corresponding to digital data "0" is composed of an ADIP unit having a second ADIP unit pattern "↑↑↓↓" and a monotone for 38 wobbles next to the ADIP unit.

FIG. 10 shows address data and an ECC for the address data. As shown, an ECC (parity) of 32 bits (=8 nibbles) is added to address data of 28 bits (=7 nibbles). It should be noted that the 28-bit address data includes a 20-bit RUB number, 2-bit RUB address number, 2-bit information for a multilayer disc and a four reserved bits. The error correction method is the nibble-based Reed-Solomon Coding RS (15, 7, 9).

Figure 11:
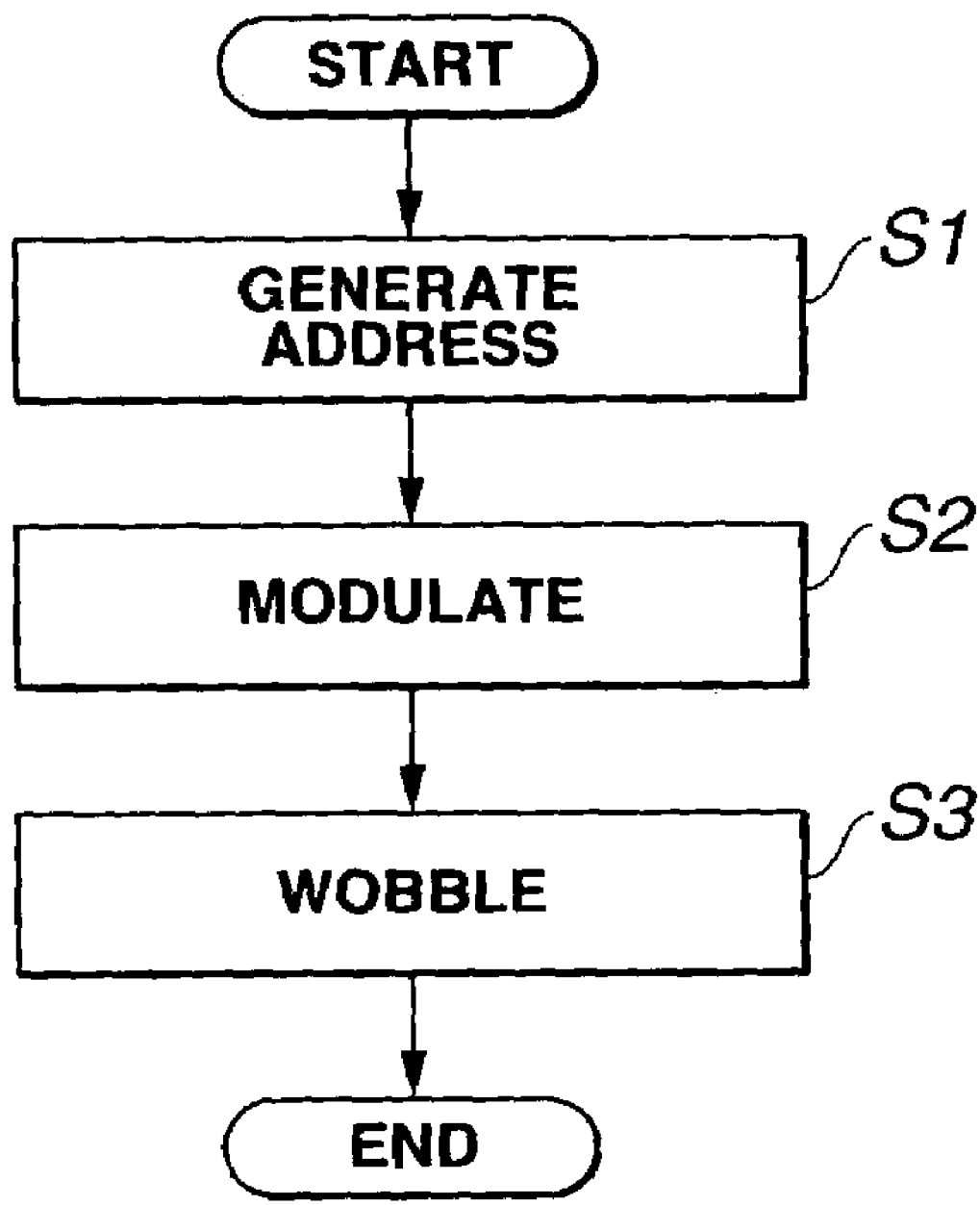
FIG. 11 shows a flow of operations made in recording an address in the address recording apparatus.

Referring now to FIG. 11, there is illustrates in the form of a flow chart operations made for recording of address information in the address recording apparatus according to the present invention. The address recording will be described below with reference to FIG. 11.

In step S1 shown in FIG. 11, the address generator 1 generates address information which is to be recorded to the optical disc 5 and composed of a sync signal, address data and an ECC for the address data, and converts the address information into a binary signal a(t) and supplies the signal to the modulator 3. At the same time, the carrier signal generator 2 generates a carrier signal x(t) (=cos θ(t)) which is to carry the address information, and supplies the signal to the modulator 3.

In step S2, the modulator 3 generates a phase modulation signal y(t) (=a(t)·cos θ(t)) corresponding to resultant address information by multiplying the address information a(t) supplied from the address generator 1 by the carrier signal x(t) (=cos θ(t)) supplied from the carrier signal generator 2 and supplies it to the wobbling unit 4.

Next in step S3, the wobbling unit 4 forms, on the optical disc 5, a spiral groove wobbled according to the phase modulation signal y(t) supplied from the modulator 3.

With the above address recording operations made by the address recording apparatus according to the present invention, address information having four different sync unit patterns included in a sync signal can be recorded as wobbles of the groove on the optical disc 5.

Figure 12:
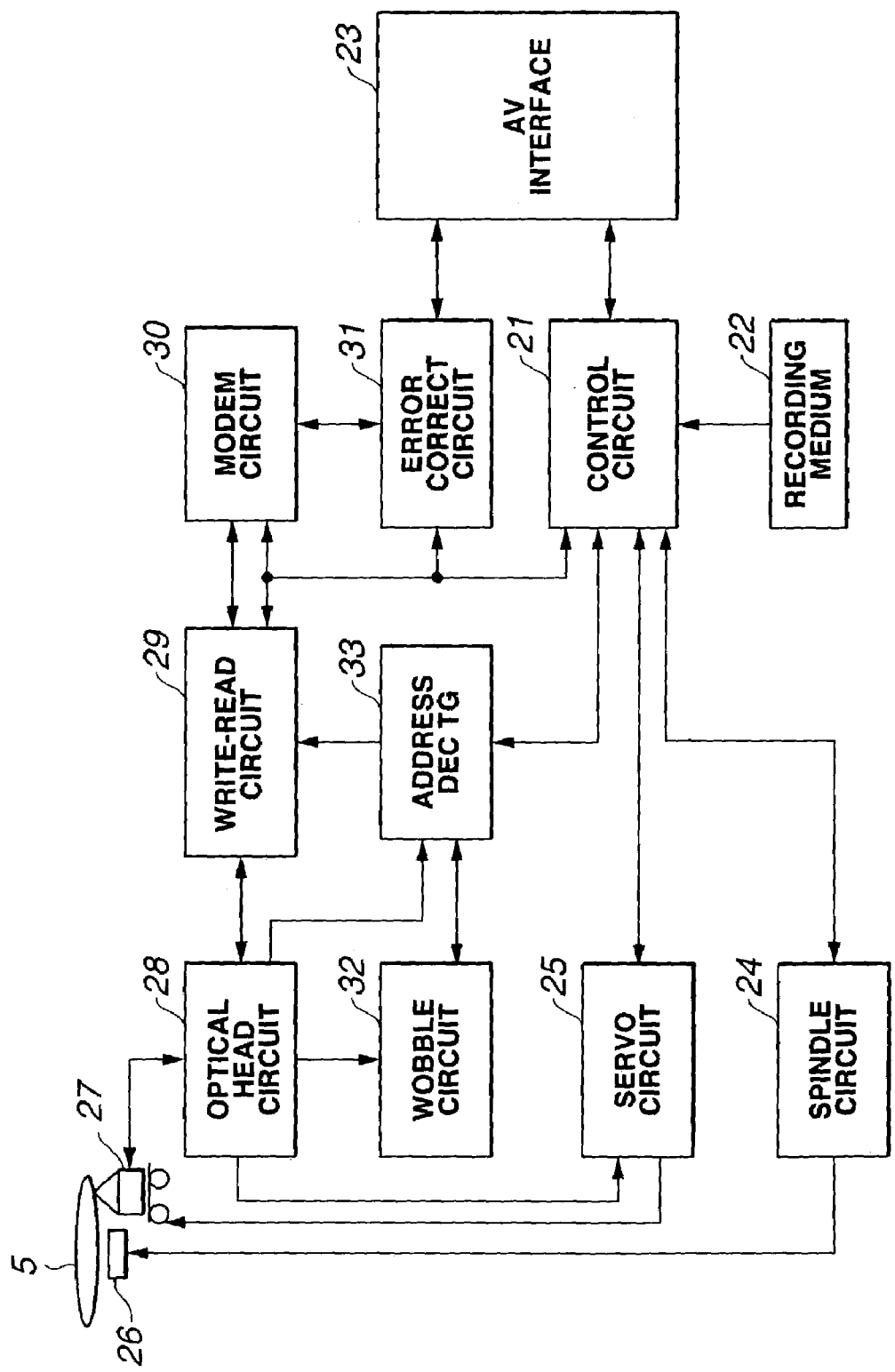
FIG. 12 is a block diagram of an optical disc drive for reproducing address information from an optical disc.

Referring now to FIG. 12, there is schematically illustrated in the form of a block diagram an example of the construction of the optical disc drive which writes and reads arbitrary data to and from the optical disc 5 having address information written as wobbles of a groove thereon by the address recording apparatus according to the present invention.

As shown in FIG. 12, the optical disc drive includes a control circuit 21 which controls components of the optical disc drive according to a control program recorded in a recording medium 22. More specifically, the control circuit 21 controls the components of the optical disc drive according to a write command supplied from an external AV apparatus or the like (not shown) via an AV interface 23 to write, to the optical disc 5, a mark corresponding to recording data supplied from the AV apparatus. Also, the control circuit 21 controls the optical disc drive components to read a mark recorded in the optical disc 5 according to a read command supplied from the AV apparatus via the AV interface 23, reproduce the recorded data, and supply it to the AV apparatus via the AV interface 23.

The optical disc drive includes also a spindle circuit 24 to control the rotation of a spindle motor 26 according to a command from the control circuit 21, and a servo circuit 25 to cause an optical pickup 27 to seek an address specified by the control circuit 21 and control the focus servo and tracking servo of the optical pickup 27 according to a focus error signal and tracking error signal supplied from an optical head circuit 28. The spindle motor 26 rotates the optical disc 5 under the control of the spindle circuit 24.

The optical pickup 27 consists of a laser output system, return line detecting system, biaxial actuator, etc. For data recording, the optical pickup 27 is controlled by the optical head circuit 28 to radiate laser light to the optical disc 5, thereby forming a mark on the optical disc 5. For data reproduction, the optical pickup 27 radiate laser light onto the optical disc 5, detects return light from the optical disc 5 and generate a corresponding return light signal, and supplies it to the optical head circuit 28.

For data recording, the optical head circuit 28 controls the laser output from the optical pickup 27 correspondingly to a header signal or write-compensated signal supplied from the write-read circuit 29. For data reproduction, the optical head circuit 28 generates an RF signal corresponding to an embossed pit and mark recorded on the optical disc 5 on the basis of the return light signal from the optical pickup 27, and supplies the RF signal to the write-read circuit 29. Further, for data reproduction, the optical head circuit 28 generates a focus error signal and tracking error signal on the basis of the return light signal from the optical pickup 27, and supplies it to the servo circuit 25 which will then generate a pushpull (will be referred to as "pp" hereunder) signal. The pp signal is supplied to a wobbling circuit 32.

For data recording, the write-read circuit 29 is controlled by the control circuit 21 to make write compensation of a signal supplied from a modem circuit 30 and supply the compensated signal to the optical head circuit 28. For data reproduction, the write-read circuit 29 converts the RF signal from the optical head circuit 28 into binarized data and supplies the data to the modem circuit 30.

For data recording, the modem circuit 30 is controlled by the control circuit 21 to modulate ECC-added recording data supplied from an error correction circuit 31 and supply the resultant signal to the write-read circuit 29. For data reproduction, the modem circuit 30 demodulates the binarized data supplied from the write-read circuit 29 and supplies the resultant read data to the error correction circuit 31.

For data recording, the error correction circuit 31 is controlled by the control circuit 21 to add ECC to the recording data supplied from the external AV apparatus or the like via the AV interface 23, and supplies the data to the modem circuit 30. For data reproduction, the error correction circuit 31 corrects any error of read data supplied from the modem circuit 30 on the basis of the ECC, and supplies the corrected data to the external AV apparatus or the like via the AV interface 23.

The wobbling circuit 32 generates a wobbling signal (equal to the phase modulation signal y(t)) corresponding to wobbles of a groove on the basis of the pp signal supplied from the optical head circuit 28, recovers the address information a(t) from the wobbling signal y(t), and supplies the recovered information to a address decoder/timing generator (DEC/TG) 33.

The DEC/TG 33 detects the position of a sync part by detecting at least one of the four types of sync unit patterns included in the sync part from the address information a(t) supplied from the wobbling circuit 32, generates an address based on address data and ECC for the address data included in a data part next to the sync unit, and supplies the address to the control circuit 21. Also, the DEC/TG 33 generates a timing signal on the basis of the detected sync part, and supplies the timing signal to various circuits in the optical disc drive via the control circuit 21.

Figure 13:
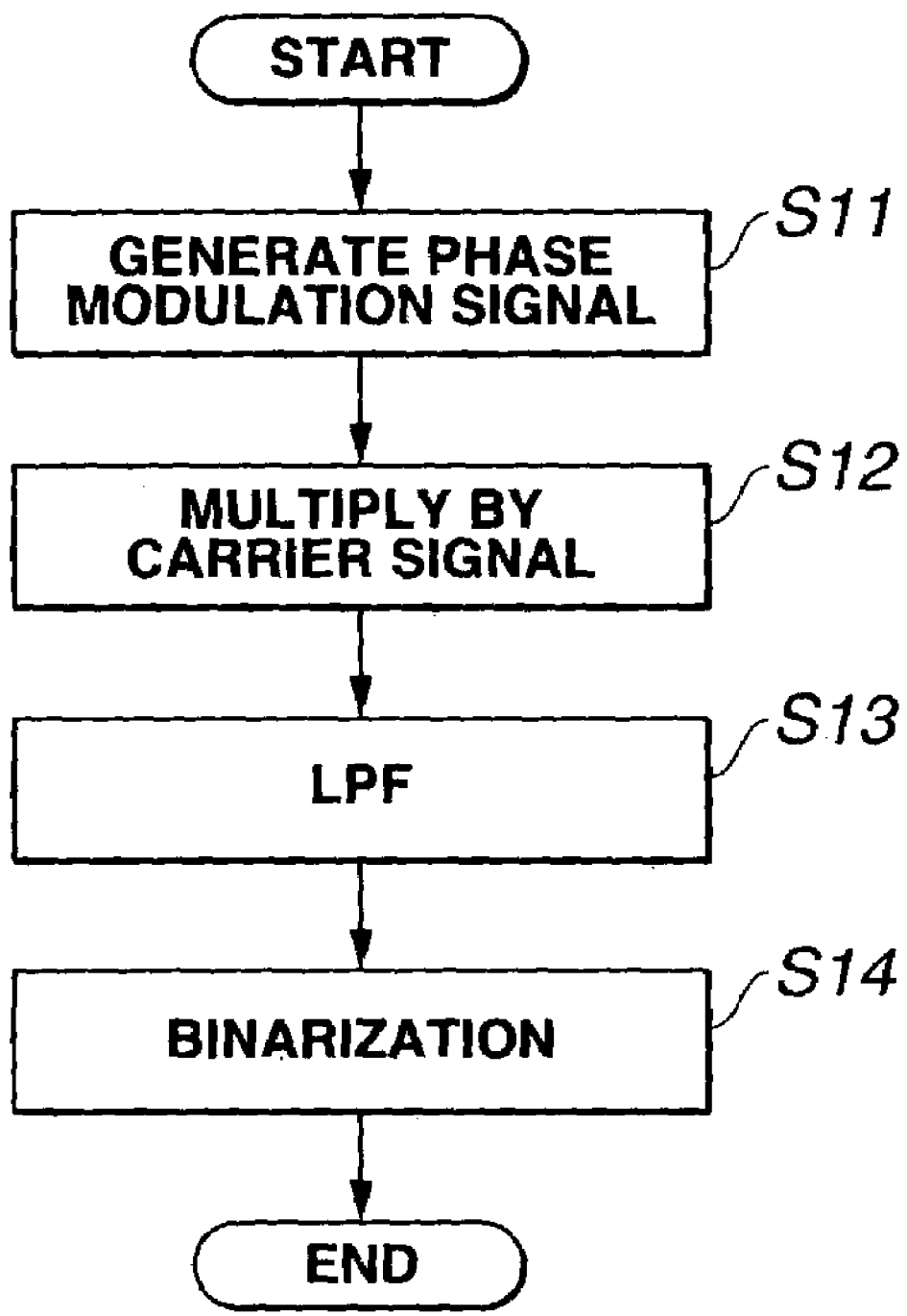
FIG. 13 shows a flow of operations made in recovery of address information by a wobbling circuit.

Next, how the wobbling circuit 32 recovers address information from a wobbling signal will be described with reference to the flow chart shown in FIG. 13. The address information recovery is effected for recording arbitrary data to the optical disc 5 and also for reproducing data recorded in the optical disc 5.

Figure 14:
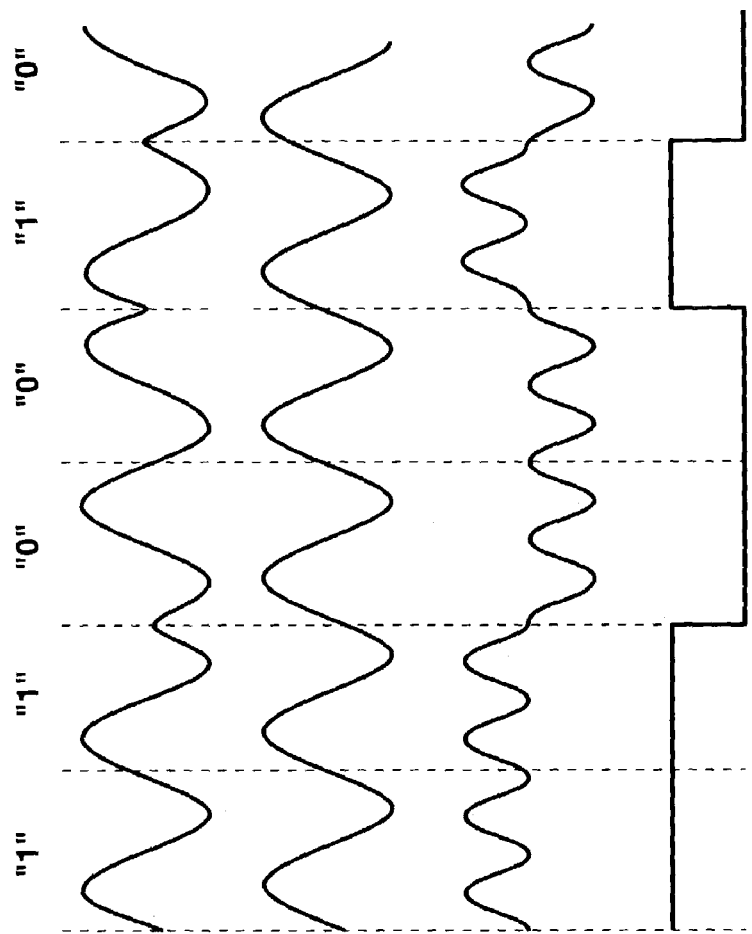
FIGS. 14A to 14D explain together how address information is recovered.

In step S11, the wobbling circuit 32 generates a wobbling signal corresponding to wobbles of a groove on the basis of the pp signal supplied from the optical head circuit 28, namely, a phase modulation signal y(t) as shown in FIG. 14A.

In step S12, the wobbling circuit 32 extracts a carrier signal x(t) (=cos θ(t)) as shown in FIG. 14B from the phase modulation signal y(t) (=a(t)·cos θ(t)), and multiplies the phase modulation signal y(t) by the carrier signal x(t) to generate a signal z(t).

$$z(t)=a(t)\cdot\cos 2\theta(t)=a(t)\cdot(\cos 2\theta(t)+1)/2$$

In step S13, the wobbling circuit 32 removes a high-frequency noise component from the signal z(t) by means of an incorporated lowpass filter. In step S14, the wobbling circuit 32 binarizes the signal z(t) from which the noise component has been removed to recover address information a(t) as shown in FIG. 14D. With the above operations, the wobbling circuit 32 recovers the address information.

As having been described in the foregoing, the optical disc drive according to the present invention can detect the position of a sync part by detecting at least one of the four types of sync unit patterns included in the sync part. Thus, it is possible to acquire address data and ECC for the address data included in a data part next to the sync part and generate an address from the address data and ECC. So, it is possible to improve the address error rate for reproduction of data and accurately access a given address on the optical disc 5.

In the aforementioned modulator 3 of the address recording apparatus, address information a(t) is subjected to phase modulation and a groove wobbled adaptively to a resultant phase modulation signal is formed on the optical disc 5. However, it should be noted that address information a(t) may be subjected to FM modulation (frequency modulation) and a groove wobbled adaptively to a resultant FM modulation signal may be formed on the optical disc 5.

Figure 15:
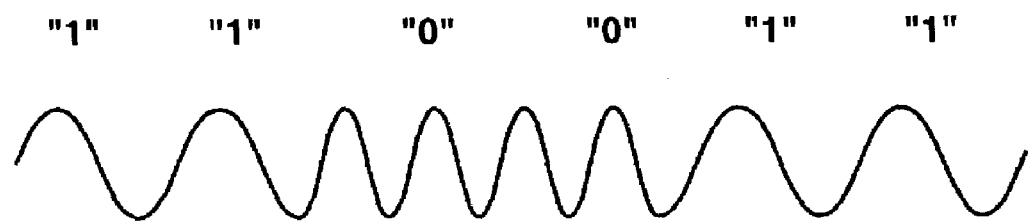
FIG. 15 explains an example of FM modulation of address information.

More particularly, in case the address information a(t) is "1" as shown in FIG. 15 for example, there is generated an FM modulation signal having the same frequency as that of a carrier signal and in phase with the latter. When the address information a(t) is "0", there is an FM modulation signal whose frequency is a half of that of the carrier signal and which is in phase with the latter.

Figure 16:
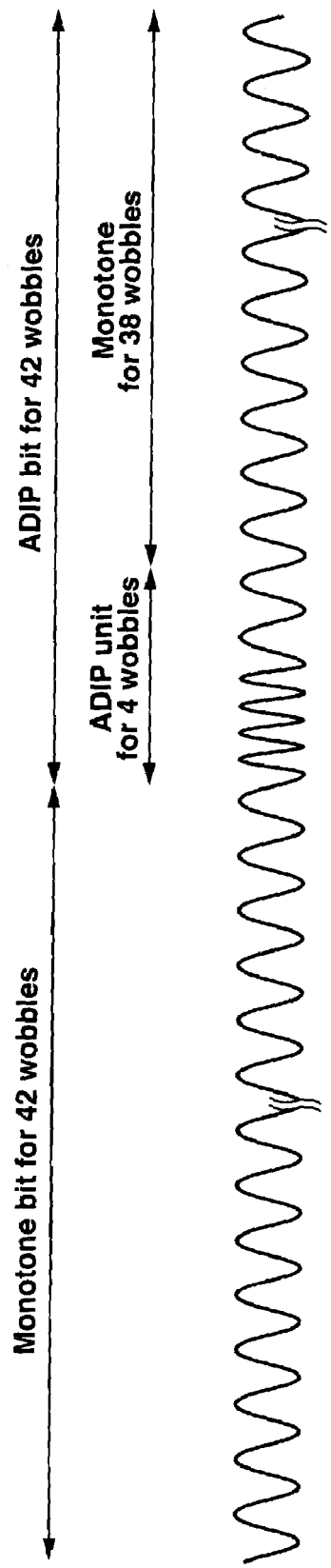
FIG. 16 shows how the groove is wobbled correspondingly to a monotone bit and ADIP bit, respectively, when address information is FM-modulated.

Even in case the FM modulation is used, 1-bit information is classified into a monotone bit for a succession of 42 wobbles whose frequency is the same as that of a carrier signal and which is in phase with the latter, and an ADIP bit or the like which is not any monotone bit and in which an FM modulation takes place in a period of 42 wobbles in carrier frequency units, as shown in FIG. 16.

In the optical disc drive to read the optical disc 5 having formed thereon a groove wobbled adaptively to the FM modulation signal of address information a(t), a wobbling signal to be read is FM demodulated to recover the address information.

Note that the present invention may be applied for recording and reproducing address information to and from the optical disc 5 as well as from disc-shaped recording media of all types.

The aforementioned series of operations can be carried out by a hardware, and also by a software. In the latter case, a program forming the software is installed from a recording medium in a computer having dedicated hardware for execution of the program or in a general-purpose personal computer, for example, which can execute various functions by installing a variety of programs.

As shown in FIG. 1, the recording medium is not only a package medium such as a magnetic disc 8 (including a floppy disc), optical disc 9 (CD-ROM (=compact disc—read-only memory), DVD (digital versatile disc), magneto-optical disc 10 (including mini disc (MD)) or a semiconductor memory 11, distributed to the users for serving the program and having the program recorded therein, but a ROM or hard disc built in a computer in advance and having the program recorded therein.

Note that in the present invention, the steps of describing the program to be recorded in a recording medium include, of course, operations made time-serially in the described order of them, and also operations made not time-serially but in parallel or individually.

INDUSTRIAL APPLICABILITY

As having been described in the foregoing, the address information recording apparatus and method and the first program according to the present invention are such that there is formed on a disc-shaped recording medium a groove wobbled adaptively to a phase modulation signal corresponding to address information composed of a sync signal including a plurality of sync unit patterns, address data and an error correction code of the address data. Thus, it is possible to record, to the disc-shaped recording medium, address information permitting accurate detection of the position of the sync signal.

Also, the address information reproducing apparatus and method and the second program according to the present invention are such that a wobbling signal is demodulated to recover address information composed of a sync signal including a plurality of sync unit patterns, address data and an error correction code of the address data, at least one of a plurality of sync unit patterns including in the sync signal in the address information is detected, the address data and error correction code for the address data is extracted from the address information on the basis of the position of the detected sync unit pattern, and the address data and error correction code are used to reproduce an address. Thus, it is possible to access a given address quickly and accurately.

Since the disc-shaped recording medium according to the present invention has formed thereon a spiral groove wobbled adaptively to a phase modulation signal correspondingly to address information composed of a sync signal including a plurality of sync unit patterns, address data and an error correction code of the address data, it is possible to access a given address quickly and accurately.

The invention claimed is:

1. An apparatus for recording address information to a disc-shaped recording medium, comprising:
    means for generating address information comprised of a sync signal including a plurality of sync unit patterns, address data and an error correction code for the address data;
    a modulating means for generating two first signals and a second signal corresponding to the address information generated by the address information generating means, the second signal being formed in between the two first signals to separate the two first signals; and
    means for forming, on a disc-shaped recording medium, a spiral groove wobbled adaptively to the two first signals and the second signal generated by the modulating means;
    wherein said plurality of sync unit patterns are defined by an interval between the two first signals separated by the second signal, and
    wherein phases of a part of the groove wobbled adaptively to the two first signals are the same as each other and opposite to the groove wobbled monotonously adaptively to the second signal.

2. The apparatus as set forth in claim 1, wherein the disc-shaped recording medium is an optical disc.

3. The apparatus as set forth in claim 1, wherein the address information generating means generates the address information comprised of the sync signal including four types of sync unit patterns, address data and the error correction code for the address data.

4. The apparatus as set forth in claim 1, wherein the second signal is a closest signal in the same phase in succession after the first phase.

5. A method for use in an apparatus for recording address information to a disc-shaped recording apparatus, the method comprising:
    a generating step of generating address information comprised of a sync signal including a plurality of sync unit patterns, address data and an error correction code for the address data;
    a modulation step of generating two first signals and a second signal corresponding to the address information generated in the address information generating step, the second signal being formed in between the two first signals to separate the two first signals; and
    a forming step of forming, on a disc-shaped recording medium, a spiral groove wobbled adaptively to the two first signals and the second signal generated in the modulating step;
    wherein said plurality of sync unit patterns are defined by an interval between the two first signals separated by the second signal, and
    wherein phases of a part of the groove wobbled adaptively to the two first signals are the same as each other and opposite to the groove wobbled monotonously adaptively to the second signal.

6. A recording medium having recorded therein a computer-readable program for recording address information to a disc-shaped recording medium, the program comprising:
    a generating step of generating address information comprised of a sync signal including a plurality of sync unit patterns, address data and an error correction code for the address data;
    a modulation step of generating two first signals and a second signal corresponding to the address information generated in the address information generating step; and
    a forming step of forming, on a disc-shaped recording medium, a spiral groove wobbled adaptively to the two first signals and the second signal generated in the modulating step, the second signal being formed in between the two first signals to separate the two first signals;
    wherein said plurality of sync unit patterns are defined by an interval between the two first signals separated by the second signal, and
    wherein phases of a part of the groove wobbled adaptively to the two first signals are the same as each other and opposite to the groove wobbled monotonously adaptively to the second signal.

7. An apparatus for recording arbitrary data to a disc-shaped recording medium, while reproducing an address on the disc-shaped recording medium on the basis of wobbles of a groove formed on the disc-shaped recording medium, the apparatus comprising:
    radiating means for radiating laser light to the disc-shaped recording medium;
    return light detecting means for detecting return light from the disc-shaped recording medium to generate a return light signal corresponding to the return light thus detected;
    wobbling signal generating means for generating a wobbling signal corresponding to the wobbles of the groove on the basis of the return light signal generated by the return light detecting means;
    demodulating means for demodulating the wobbling signal generated by the wobbling signal generating means to recover address information comprised of a sync signal including a plurality of sync unit patterns, address data and an error correction code for the address data; wherein said plurality of sync unit patterns are defined by an interval between a part of the groove wobbled adaptively to two first signals separated by a second signal in the demodulated wobbling signal, the second signal being formed in between the two first signals to separate the two first signals, and wherein phases of the part of the groove wobbled adaptively to the two first signals are the same as each other and opposite to parts of the monotonously wobbled groove wobbled adaptively to the second signal;
    means for detecting at least one of the plurality of sync unit patterns included in the sync signal in the address information recovered by the address information recovering means;
    sync unit pattern detecting means for acquiring the address data and the error correction code for the address data from the address information on the basis of the position of the sync unit pattern detected by the sync unit pattern detecting means;

reproducing means for reproducing the address on the basis of the address data and the error correction code for the address data, extracted by the acquiring means; and recording means for recording arbitrary data to the disc-shaped recording medium based on the address data.

8. The apparatus as set forth in claim 7, wherein the disc-shaped recording medium is an optical disc.

9. The apparatus as set forth in claim 7, further comprising means for generating a clock signal on the basis of the position of the sync unit pattern detected by the detecting means.

10. The apparatus as set forth in claim 7, wherein the second signal is a closest signal in the same phase in succession after the first phase.

11. A method for use in an apparatus for recording arbitrary data to a disc-shaped recording medium, while reproducing an address on the disc-shaped recording medium on the basis of wobbles of a groove formed on the disc-shaped recording medium, the method comprising:

a radiating step of radiating laser light to the disc-shaped recording medium;

a return light detecting step of detecting return light from the disc-shaped recording medium to generate a return light signal corresponding to the return light thus detected;

a wobbling signal generating step of generating a wobbling signal corresponding to the wobbles of the groove on the basis of the return light signal generated in the return light detecting step;

a demodulating step of demodulating the wobbling signal generated in the wobbling signal generating step to recover address information comprised of a sync signal including a plurality of sync unit patterns, address data and an error correction code for the address data;

wherein said plurality of sync unit patterns are defined by an interval between a part of the groove wobbled adaptively to two first signals separated by a second signal in the demodulated wobbling signal, the second signal being formed in between the two first signals to separate the two first signals, and wherein phases of the part of the groove wobbled adaptively to the two first signals are the same as each other and opposite to parts of the monotonously wobbled groove adaptively wobbled to the second signal;

a sync unit pattern detecting step of detecting at least one of the plurality of sync unit patterns included in the sync signal in the address information recovered in the address information recovering step;

an acquiring step of acquiring the address data and error correction code for the address data from the address information on the basis of the position of the sync unit pattern detected in the sync unit pattern detecting step;

a reproducing step of reproducing the address on the basis of the address data and the error correction code for the address data, extracted in the acquiring step; and a recording step of recording arbitrary data to the disc-shaped recording medium based on the address data.

12. A recording medium having recorded therein a computer-readable program for recording arbitrary data to a disc-shaped recording medium, while reproducing an address on the disc-shaped recording medium on the basis of wobbles of a groove formed on the disc-shaped recording medium, the program comprising:

a radiating step of radiating laser light to the disc-shaped recording medium;

a return light detecting step of detecting return light from the disc-shaped recording medium to generate a return light signal corresponding to the return light thus detected;

a wobbling signal generating step of generating a wobbling signal corresponding to the wobbles of the groove on the basis of the return light signal generated in the return light detecting step;

a demodulating step of demodulating the wobbling signal generated in the wobbling signal generating step to recover address information comprised of a sync signal including a plurality of sync unit patterns, address data and an error correction code for the address data; wherein said plurality of sync unit patterns are defined by an interval between a part of the groove wobbled adaptively to two first signals separated by a second signal in the demodulated wobbling signal, the second signal being formed in between the two first signals to separate the two first signals, and wherein phases of the part of the groove wobbled adaptively to the two first signals are the same as each other and opposite to parts of the monotonously wobbled groove wobbled adaptively to the second signal;

a sync unit pattern detecting step of detecting at least one of the plurality of sync unit patterns included in the sync signal in the address information recovered in the address information recovering step;

an acquiring step of acquiring the address data and error correction code for the address data from the address information on the basis of the position of the sync unit pattern detected in the sync unit pattern detecting step;

a reproducing step of reproducing the address on the basis of the address data and the error correction code for the address data, extracted in the acquiring step; and a recording step of recording arbitrary data to the disc-shaped recording medium based on the address data.

13. A disc-shaped recording medium having formed thereon a spiral groove having a part wobbled as a monotone wobble that has a phase and a part wobbled adaptively to two first signals and a part wobbled adaptively to a second signal, the second signal being formed in between the two first signals to separate the two first signals, wherein phases of the two first signals are the same as each other and opposite to the phase of the second signal, wherein said groove is wobbled corresponding to address information comprised of a sync signal including a plurality of sync unit patterns, address data and an error correction code for the address data; and wherein said plurality of sync unit patterns are defined by an interval between the groove wobbled adaptively to the two first signals separated by the second signal among the monotone wobble.

14. The recording medium as set forth in claim 13, being an optical disc.

15. An apparatus for recording arbitrary data to a disc-shaped recording medium, while reproducing an address on the disc-shaped recording medium on the basis of wobbles of a groove formed on the disc-shaped recording medium, the apparatus comprising:

a radiating device configured to radiate laser light to the disc-shaped recording medium;

a return light detecting device configured to detect return light from the disc-shaped recording medium to generate a return light signal corresponding to the return light thus detected;

a wobbling signal generating device configured to generate a wobbling signal corresponding to the wobbles of the groove on the basis of the return light signal generated by the return light detecting device;

a demodulator configured to demodulate the wobbling signal generated by the wobbling signal generating device to recover address information comprised of a sync signal including a plurality of sync unit patterns, address data and an error correction code for the address data; wherein said plurality of sync unit patterns are defined by an interval between a part of the groove wobbled adaptively to two first signals separated by a second signal in the demodulated wobbling signal, the second signal being formed in between the two first signals to separate the two first signals, and wherein phases of the part of the groove wobbled adaptively to the two first signals are the same as each other and opposite to parts of the monotonously wobbled groove wobbled adaptively to the second signal;

a device configured to detect at least one of the plurality of sync unit patterns included in the sync signal in the address information recovered by the demodulator;

a sync unit pattern detecting device for acquiring the address data and the error correction code for the address data from the address information on the basis of the position of the sync unit pattern detected;

a reproducing device configured to reproduce the address on the basis of the address data and the error correction code for the address data; and a recording device configured to record arbitrary data to the disc-shaped recording medium based on the address data.

* * * * *